United States Patent
Wang et al.

(10) Patent No.: US 10,642,627 B2
(45) Date of Patent: May 5, 2020

(54) SYSTEMS, METHODS, AND DEVICES FOR CONTEXT-AWARE APPLICATIONS

(71) Applicant: Alibaba Group Holding Limited, George Town (KY)

(72) Inventors: Kai Wang, Beijing (CN); Zhijun Yuan, Hangzhou (CN); Xinzheng Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/728,328

(22) Filed: Oct. 9, 2017

(65) Prior Publication Data
US 2018/0107491 A1    Apr. 19, 2018

(30) Foreign Application Priority Data

Oct. 13, 2016    (CN) .......................... 2016 1 0895318

(51) Int. Cl.
| | |
|---|---|
| *G06F 9/455* | (2018.01) |
| *G06F 9/445* | (2018.01) |
| *H04L 29/08* | (2006.01) |
| *G06F 9/46* | (2006.01) |
| *G06F 9/54* | (2006.01) |

(52) U.S. Cl.
CPC .............. *G06F 9/445* (2013.01); *G06F 9/461* (2013.01); *G06F 9/542* (2013.01); *H04L 67/327* (2013.01); *H04L 67/12* (2013.01); *H04L 67/18* (2013.01); *H04L 67/26* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 9,495,560 | B2 * | 11/2016 | Saidi | H04L 63/20 |
| 9,507,630 | B2 * | 11/2016 | Addepalli | G06F 9/461 |
| 9,726,498 | B2 * | 8/2017 | Meduna | G06F 1/3206 |
| 9,965,365 | B2 * | 5/2018 | Lee | G06F 11/2015 |
| 10,489,221 | B2 | 11/2019 | Zhao | |
| 2003/0187964 | A1 * | 10/2003 | Sage | H04L 67/1095 709/221 |
| 2004/0225654 | A1 | 11/2004 | Banavar | |
| 2008/0221846 | A1 | 9/2008 | Aggarwal | |
| 2009/0157587 | A1 | 6/2009 | Lim | |
| 2010/0100941 | A1 | 4/2010 | Eom | |
| 2010/0115530 | A1 * | 5/2010 | Ahmad | G06F 9/461 718/108 |
| 2014/0025786 | A1 | 1/2014 | Gage | |
| 2014/0331275 | A1 | 11/2014 | Singh | |
| 2015/0113567 | A1 | 4/2015 | Scheer | |

* cited by examiner

*Primary Examiner* — Van H Nguyen
(74) *Attorney, Agent, or Firm* — Van Pelt, Yi & James LLP

(57) ABSTRACT

A method for applications includes: determining context-related information based on a system signal obtained; executing a target application corresponding to the context-related information, wherein the target application comprises at least one application unit; and using the target application to perform a corresponding operation.

12 Claims, 11 Drawing Sheets

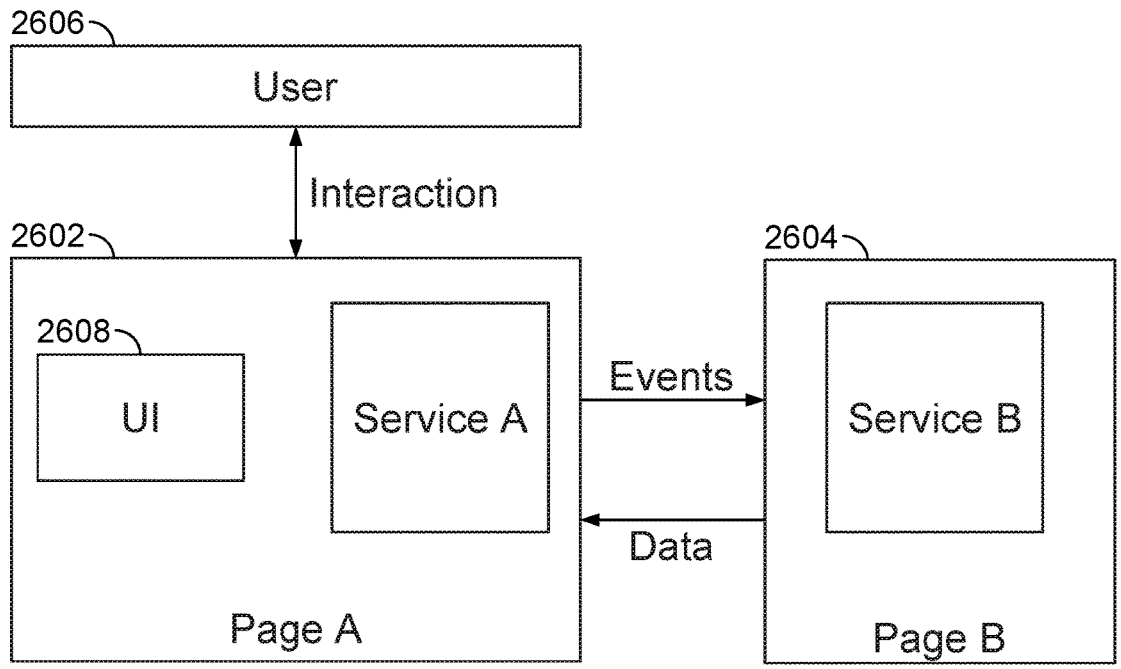
FIG. 2F
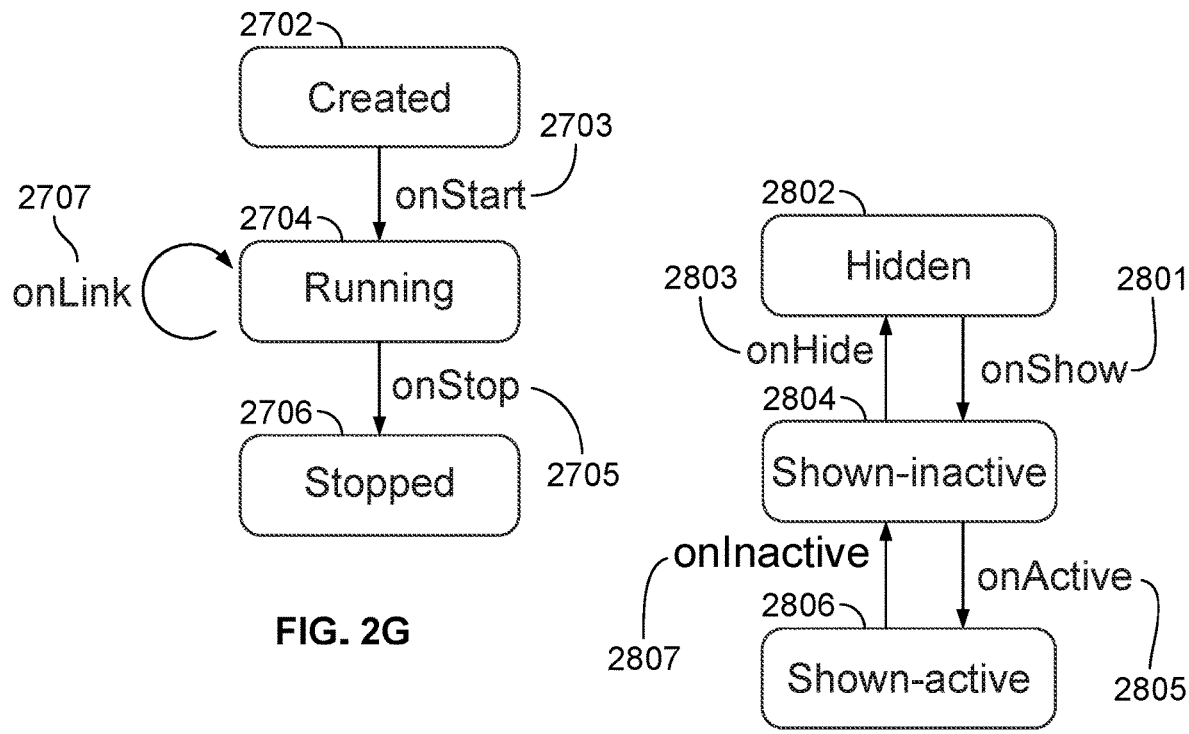
FIG. 2G
FIG. 2H

SYSTEMS, METHODS, AND DEVICES FOR CONTEXT-AWARE APPLICATIONS

CROSS REFERENCE TO OTHER APPLICATIONS

This application claims priority to People's Republic of China Patent Application No. 201610895318.X entitled A CONTEXT-BASED APP OPERATING METHOD, MEANS, TERMINAL DEVICE AND SYSTEM, filed Oct. 13, 2016 which is incorporated herein by reference for all purposes.

FIELD OF THE INVENTION

The present application generally relates to the field of terminal device technology and more particularly, to the context-aware computing technology.

BACKGROUND OF THE INVENTION

With the terminal device technology developing to encompass an increasing number of device types, for example, screen-based devices, screenless devices, wearable devices and household devices, more and more people have become users of such terminal devices, and more and more functionalities and services have become available at such terminal devices. Presently, services provided at terminal devices are generally provided in the form of applications (also referred to as apps), while interfaces for accessing the services provided at terminal devices are generally displayed on a home screen or desktop screen of the terminal devices. Also, different user services are provided through different apps that specialize in servicing a particular type of user needs. For instance, a chat service is provided through an instant messaging app, while an on-line shopping service is provided through an e-commerce user app. Users can manually activate different apps that provide for different services according to the users' needs. Presently, when switching context, the users are required to manually switch from one context-based app to another, which can be inconvenient, time consuming, and sometimes even untimely to accommodate the underlying changes of users' needs for context-based services.

BRIEF DESCRIPTION OF THE DRAWINGS

Various embodiments of the invention are disclosed in the following detailed description and the accompanying drawings.

FIG. 2F is a functional block diagram illustrating an example interaction between Pages, in accordance with one or more embodiments of the present disclosure.

FIG. 2G is a schematic diagram illustrating an example state transitioning of a Page, in accordance with one or more embodiments of the present disclosure.

FIG. 2H is a schematic diagram illustrating another example state transitioning of a Page, in accordance with one or more embodiments of the present disclosure.

DETAILED DESCRIPTION

Figure 1:
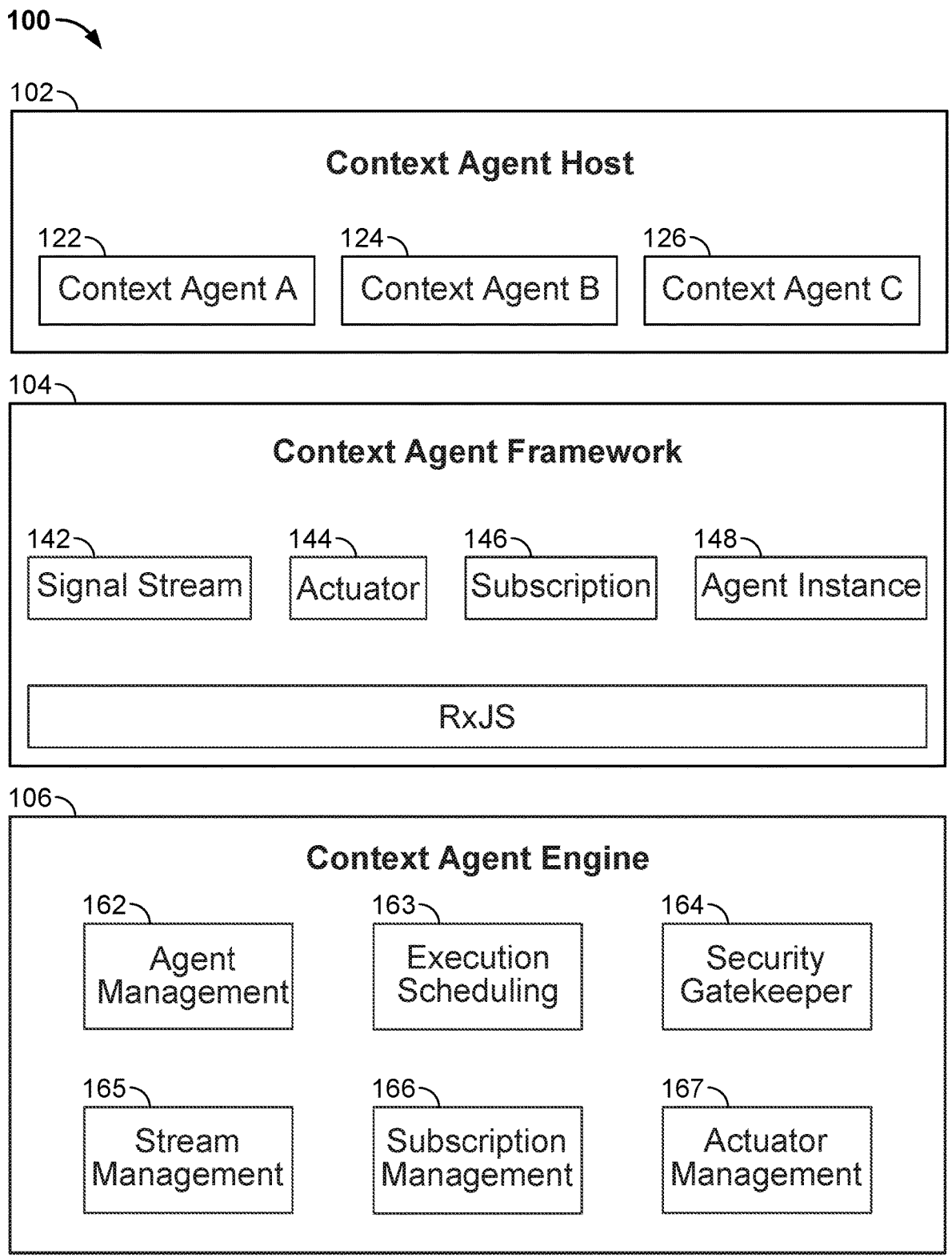
FIG. 1 is a block diagram illustrating an example system model for context-aware applications, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

It must be noted that the terms "first," "second," etc. in the description and claims of the present application, as well as in the drawings, are used to differentiate similar objects, and are not necessarily intended to describe a specific order or sequence. It should be understood that data used in this way is interchangeable in the appropriate situations, so that the embodiments of the present application described here can be implemented in sequences other than those shown or described here. Moreover, the terms "includes" and "has" and any variations thereof are intended to cover non-exclusive inclusion; for example, processes, methods, systems, products, or equipment that includes a series of steps or units is not necessarily limited to the steps or units that are explicitly enumerated, but may comprise other steps or units that are not explicitly enumerated or are inherent to these processes, methods, systems, products, or equipment.

The term "terminal device" as used herein refers to a computing device enabled with applications such as multimedia functionalities and services. Examples of a terminal device include a smart phone, a tablet, a wearable device, a set-top box, a personal computer, a smart television, a smart household appliance, a desktop computer, a laptop computer, an Internet of Things (IoT) object, or the like. A terminal device can be configured to provide services of audio, video, data, etc. to a user. In some embodiments, a terminal device can be further configured to incorporate a display such as a touchscreen. In various embodiments, a terminal device may be configured to install various operating systems including but not limited to smart operating systems such as IOS, Android, and Alibaba™ Cloud OS.

The terms "component," "service," "model," "applications," and "system" as used herein refer to a computer-related entity, either hardware, a combination of hardware and software, software, or software in execution. For example, a component may be, but is not limited to, a process running on a processor, a processor, an object, an executable, a thread of execution, a program, and/or a computer. One or more components may reside within a process and/or thread of execution and a component may be localized on one computer and/or distributed between two or more computers.

The term "Internet of Things" (IoT) as used herein refers to the technology implementing the architecture that a large number of objects, not limited to computers or computer networks, can be readable, recognizable, locatable, and controllable via a network (e.g., the Internet). Example objects of an IoT network can include a variety of information-gathering devices such as RFID equipped devices, infrared sensor equipped devices, global positioning systems (GPS) equipped devices, laser scanner equipped devices, and the like. In the age of ubiquitous connectivity of things, terminal devices of users are becoming increasingly diverse to include devices with screens, devices without screens, household devices, wearable devices, and the like.

FIG. 1 illustrates a block diagram of an example system model for context-aware applications, in accordance with an embodiment of the present disclosure. System 100 includes a Context Agent Host 102, a Context Agent Framework 104, and a Context Agent Engine 106. In one embodiment, system 100 for context-aware apps is implemented by using standard app development models. As used herein, a context refers to the settings and/or conditions under which a user is performing his/her operations. In this example, Context Agent Engine 106 and Context Agent Framework 104 are software code implemented at the system layer for the purposes of being able to collect or detect context information provided from the lower layers. Also, Context Agent Framework 104 is implemented using a dynamic programming language such as Javascript from a reactiveX library (RxJS) to provide for a reactive programming model, an asynchronous programming paradigm with observable data streams. Further, a unified protocol for interconnecting with objects such as various IoT devices is implemented as part of the system. By connecting and controlling various terminal devices as well as various services provided thereon, system 100 allows users to be serviced with proactive and automated context-aware applications. Context Agent Host 102 is an app container with context-detecting capability. As used herein, an app container refers to software code of operating system virtualization which provides a lightweight virtual environment that groups and isolates a set of processes and resources such as memory, CPU, disk, etc., from a host and any other containers. Context Agent Host 102 inherits from Page, which is an app unit (a base object class defining elements common to abstracting local services and remote services) at the highest parent level and details of which are illustrated below with reference to FIG. 2B. A developer uses an instance of Context Agent Host 102 to configure an app context, which in turn runs in a system as an app. As shown herein, Context Agent Host 102 includes a Context Agent A 122, Context Agent B 124, and Context Agent C 126, which represent context app A, context app B, and context app C, respectively.

Context Agent Framework 104 is an application framework in communication with an underlying context analysis engine, e.g., Context Agent Engine 106. It is through Context Agent Framework 104 that lower system layers provide applications or services at the upper system layers, e.g., Context Agent Host 102 or the like, with the functionalities of detecting context and providing context-aware services.

In this example, Context Agent Framework 104 includes components of Signal Stream 142, Subscription 146, Actuator 144, and Agent Instance 148. Each of these components is configured to utilize a dynamic programming language such as Javascript supported by, for example, a reactiveX library of Javascript (RxJS), to handle the processing logic corresponding to a context. Context Agent Framework 104 is described in further details with reference to FIG. 2C.

Context Agent Engine 106 is a system service of a context engine, which can be implemented as a stand-alone service embedded in (e.g., that is a part of) the system. Context Agent Engine 106 is configured to manage a context-based app, e.g., Context Agent Host 102, at the upper layer of the system. The Context Agent Engine 106 is described in further details with reference to FIG. 2E.

In this example, Context Agent Engine 106 includes components of Agent Management 162, Execution Scheduling 163, Security Gatekeeper 164, Stream Management 165, Subscription Management 166, and Actuator Management 167. Details of these components are further illustrated below with reference to FIG. 2C.

Figure 2A:
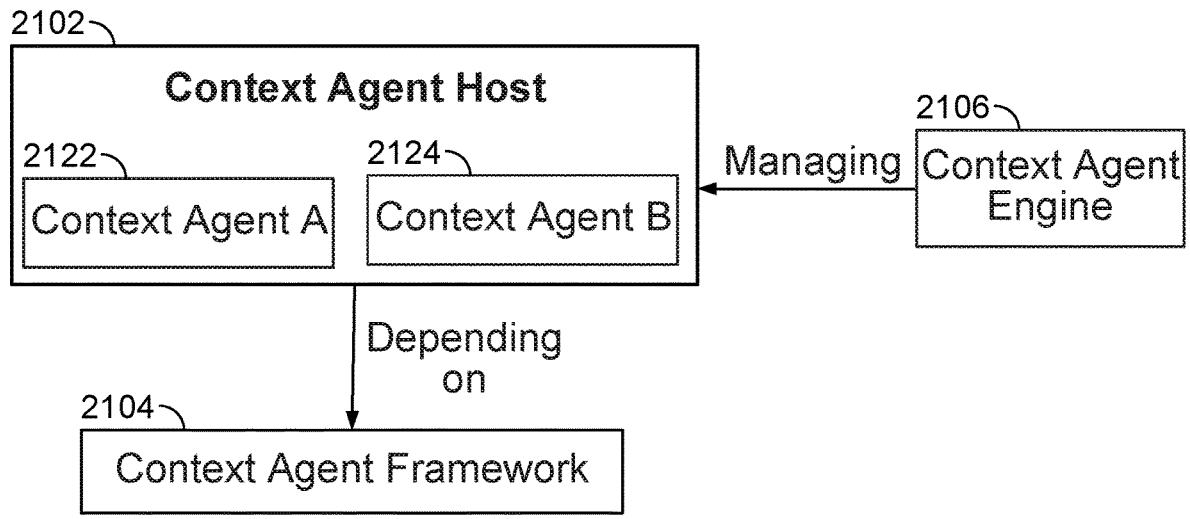
FIG. 2A is a relational diagram illustrating components of an example system model for context-aware applications, in accordance with one or more embodiments of the present disclosure.

FIG. 2A illustrates a relational block diagram of components of an example system model for context-aware services, in accordance with an embodiment of the present disclosure. As shown herein, Context Agent Host 2102, which includes instances of Context Agent A 2122 and Context Agent B 2124, depends from Context Agent Framework 2104 for inheritance of its functionalities. Context Agent Host 2102 is also managed by Context Agent Engine 2106, the details of which are illustrated with reference to FIG. 2E.

Figure 2B:
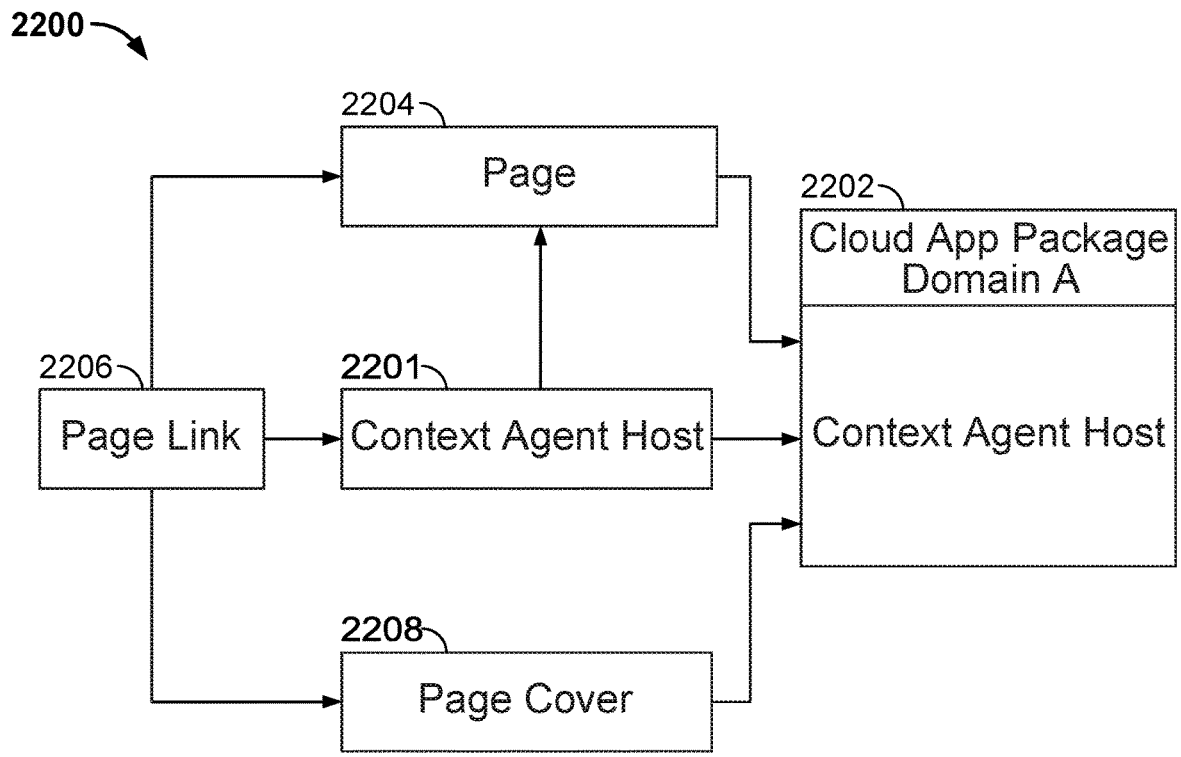
FIG. 2B is a block diagram of an example context-aware application, in accordance with one or more embodiments of the present disclosure.

FIG. 2B illustrates a block diagram of an example context-aware app developed according to system model 100 of FIG. 1, in accordance with an embodiment of the present disclosure. As shown, a context-aware application 2200 comprises components of a Cloud App Package 2202, a Page 2204, a Page Link 2206, and an optional Page Cover 2208.

First, a developer builds context-aware apps derived from Context Agent Host 102 of FIG. 1. Such a context-aware app can be presented in the form of, for example, a Cloud App Package 2202, which is a complete app package (e.g., a complete set of files that can be executed on its own) corresponding to handling a context. In some embodiments, a Cloud App Package is identified by domain names.

Page 2204 is the unit (e.g., the base object class) of an app at the highest parent level. In other words, Page 2204 is the most base level app unit from which an app is derived. In this example, Context Agent Host 2201 inherits from Page 2204 the functionalities of detecting context and providing context-aware service.

Page Cover 2208 is a visualization component configured to provide the context-aware application with a user interface, which is configured to allow for interactions between a user and a device. Page Cover 2208 is optional in the sense that sometimes there is no requirement to obtain user input or provide users with feedback or options in the process of servicing a context.

Page Link 2206 is a protocol for inter-app communication. Page Link 2206 can be used to invoke a context-aware app or to communicate with other apps. Page Link 2206 can be implemented using mechanisms such as the intents mechanism or the services mechanism.

In this example, a Cloud App Package 2202, identified by reference to a domain A, is downloaded and installed on a terminal device for execution. After an application context is detected, the context-aware app comprising one or more Pages is executed to provide a service corresponding to the context. In addition, through a human-machine interface, the context-aware app further provides interactions with a user to facilitate the user's control of the app.

Figure 2C:
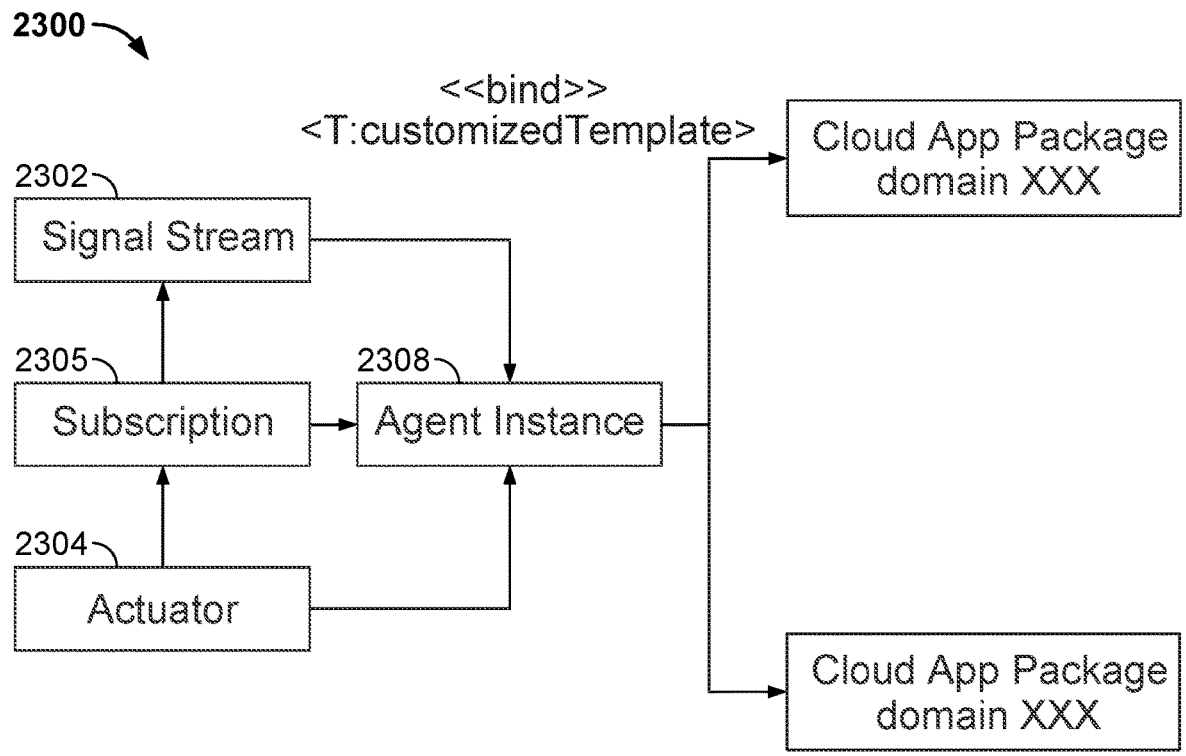
FIG. 2C is a block diagram of various components of an example Context Agent Framework of System 100 of FIG. 1, in accordance with one or more embodiments of the present disclosure.

FIG. 2C illustrates a block diagram of various components of an example Context Agent Framework 104 of system model 100 of FIG. 1, in accordance with an embodiment of the present disclosure. Context Agent Framework 2300 comprises components of Signal Stream 2302, Actuator 2304, Subscription 2305, Agent (not shown) and Agent Instance 2308.

Agent is a complete context logical unit (e.g., a software process) by which the detecting and logical processing of a context is set forth.

Agent Instance is an instance of Agent instantiated for a particular environment and a particular device.

Signal Stream is a stream of signals received from sources such as I/O interfaces of various devices and systems, such as a temperature signal, humidity signal, motion signal, etc. Through operations on the signals of the Signal Stream, applications at higher system layers are furnished with the capabilities to detect a context. Also, Agent is configured to organize processing logic components to detect contexts by using the Signal Stream.

Subscription is a subscription relationship mapping various signals to their corresponding contexts. A table, a configuration file, or the like can be used to maintain the correspondence relationships. It is through Subscription that signals detected correlate to contexts determined, which in turn correlate to corresponding context-based apps.

Actuator is a specific executable task of a context-aware service. It is the actual service to be performed when the system detects a context and thereby carries out correspondent logical processing of the context. For example, an Actuator can be tasked to, after detecting that the weather is hot and humid, turn on the air conditioning.

Context Agent Engine is configured to manage all the context-aware apps and to maintain the life cycles thereof. The life cycle of an app is illustrated with further details with reference to FIG. 2D.

Figure 2D:
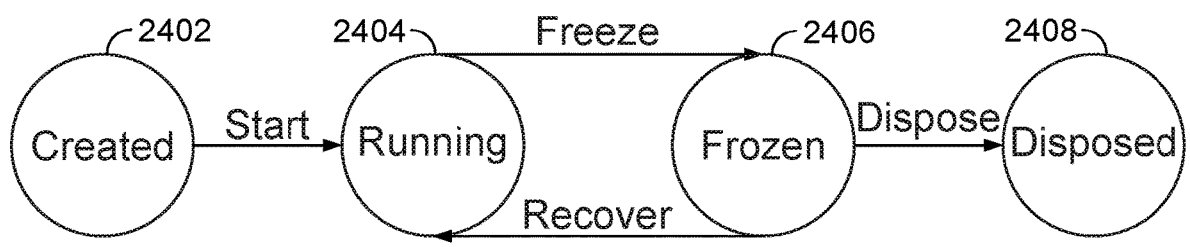
FIG. 2D is a state diagram of an example life cycle of a context-aware application, in accordance with one or more embodiments of the present disclosure.

FIG. 2D illustrates a state diagram of an example life cycle of a context-aware application, in accordance with an embodiment of the present disclosure. An app goes through a life cycle comprising the states of Created, Running, Frozen, and Disposed.

Created 2402 is the state that an app has been created, indicating that the context-aware app at this state has already been installed on the user target device.

Running 2404 is the state of execution, during which an app performs operations according to the logic set forth by Agent.

Frozen 2406 is the state of frozen operations, during which an app no longer uses system resources, or provides any context services. In this state, the system resources previously reserved or used by the app can either be released in entirety, in part, or not at all. However, the app can be recovered or restored back to the running state 2404, in which the app continues to be executed by Context Agent Engine.

Disposed 2408 is the state of completion and conclusion of execution. The app process ends and all resources are released.

Figure 2E:
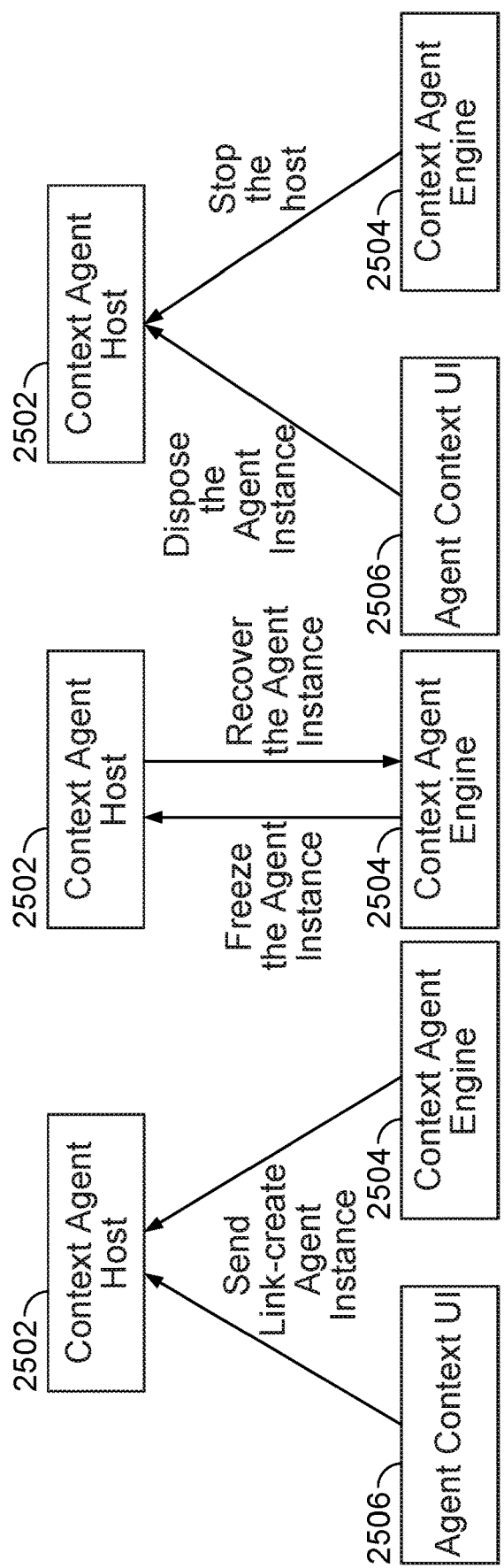
FIG. 2E is a schematic diagram of example context-aware app state transitions controlled by Context Agent Engine 106 of FIG. 1, in accordance with one or more embodiments of the present disclosure.

FIG. 2E illustrates a schematic diagram of example context-aware app state transitions controlled by Context Agent Engine 106 of FIG. 1, in accordance with an embodiment of the present disclosure. In this example, first, Context Agent Host 2502 is created by use of Context Agent Engine 2504 and Agent Control UI 2506. Later, Context Agent Engine 2504 can set Context Agent Host 2502 in a frozen state and later on restores the Context Agent Host 2502 into a running state. Context Agent Engine 2504 also controls Context Agent Host 2502 to conclude its execution, and correspondingly stops Dynamic Page Manager Service (DPMS) from servicing as well. In some embodiments, DPMS, generally implemented as a service process, is used as a management service for executing Page instances. Context Agent Engine 2504 can communicate the afore-mentioned control in the form of an event to Context Agent Host 2502 using inter-process communication mechanisms such as the intent mechanism, binders mechanism, Anonymous Shared Memory mechanism, or any suitable mechanisms for inter-process communication. DPMS is described in more detail below.

Next, an example of Page management based on YunOS (also referred to as Aliyun OS), a mobile operating system, is described. The technique described is also applicable to other operating systems such as IOS, Android, etc.

(1) Page

Page as used herein refers to a service component, abstracting local services and remote services in the form of a base unit of app. By packaging different data and functions, a Page provides various kinds of services. In some embodiments, one context-aware service or app can include more than one Page. For example, a context-aware app can include one Page to provide a service of a UI (user interface), another for picture-taking, and/or another for a background service, such as account authentication. A Page in execution is herein referred to as a Page instance. It is an execution entity for performing a local service or a remote service, and can be created by use of DPMS. For example, after receiving a Page Link to Page B sent by Page A, DPMS creates an instance of Page B. Page instances are also scheduled, or managed by DPMS, which also maintains the life cycle of Page instances.

Each Page has a unique identifier in the YunOS. For example, a Page can be identified using a URI (Uniform Resource Identifier), which is generated by use of various suitable techniques that produce uniqueness in the identifiers. A URI functions as an address link to uniquely determine a corresponding Page. For example, to distinguish the services provided by Pages, pertinent information such as the title of a service, content of a service, delivery method of a service, provider of a service, etc. can be embedded in the corresponding URIs and assigned to the Pages.

Taking a calendar service provided by Company A for example, the URI assigned to the Page corresponding to the Company A's calendar service can be configured as:

Page://calendar.a.com

In the above, "Page://" is used to distinguish this address as the address corresponding to a Page and from addresses of other types such as a www site or an FTP site. "Calendar" indicates the title of the service provided, while "a" indicates the information about the service provider being company A.

Depending on the needs of a context, a Page may require the creation of multiple Page instances. To distinguish different instances of the same Page, a unique Page ID is further assigned to each Page instance for the purpose of identification. Such identifiers can be assigned when a Page instance is created. A Page instance is the executing state of a Page, i.e., the executing entity of a local or remote service. Again, the DPMS creates, schedules, and manages the life cycle of a Page instance. Likewise, a Page ID can be embedded in an information element (Page Link) and transmitted.

FIG. 2F illustrates a functional block diagram of an example interaction between Pages, in accordance with an embodiment of the present disclosure. In this example, Page A 2602 sends an event (e.g., included in a Page Link) to Page B 2604 and obtains data back from Page B 2604. Page A 2602 also interacts with a user 2606 through a UI 2608. Also as shown herein, Page A 2602 provides for Service A, and Page B 2604 provides for Service B. Page A 2602 provides to a user 2606 a display interface in the form of a UI 2608, through which results of Service A are delivered to the user 2606 and various inputs from the user 2606 are received. Further, Page B 2604 is configured to primarily run in the background and to provide service support for other Pages.

Further, a Page can be developed and destroyed and therefore has three states between being developed and destroyed.

Created is the state indicating that a Page has been created. After the Page is created (i.e., instantiated), it enters into the Created state.

Running is the state of execution after a Page is created. In this state, events and/or data are transmitted between Pages, and processed by respective receiving Pages.

Stopped is the state indicating that a Page is deactivated. In this state, a Page does not transmit events and/or data with other Pages.

FIG. 2G illustrates an example state switching of a Page, in accordance with an embodiment of the present disclosure. A Page is capable of switching between different states described above. Also, a life event notification is received at the time of switching to configure the Page's state after switching. DPMS controls Page state switching and life event notification.

As shown herein, when a Page (not shown) receives an onStart event 2703, the Page leaves Created state 2702 and enters Running state 2704. When the Page receives an onStop event 2705, the Page leaves Running state 2704 and enters Stopped state 2706. When in Running state 2704, the Page receives Page Links sent by the other Pages via the onLink interface 2707. The onStart event 2703 is the life event notification used to instruct the Page to begin entering Running state 2704. The onStop event 2705 is the life event notification used to instruct the Page to begin entering Stopped state 2706.

FIG. 2H illustrates another example state transitioning of a Page, in accordance with an embodiment of the present disclosure. For a Page having a UI (user interface), the running state can be in one of the following three sub-states:

Hidden is a sub-state when a page runs in the background and is not displayed to the user.

Shown-inactive (visibly non-interactive) is a sub-state when a page is displayed to the user in a mode that is not responsive to any user input.

Shown-active (visibly interactive) is a sub-state when a page is displayed to the user in a mode that is responsive to user inputs.

For example, Page A is displayed in a full-screen window; Page B is displayed in a partial-screen window. When Page B is displayed on top of Page A, Page A is in Shown-inactive sub-state, and Page B is in Shown-active sub-state.

Through life event notifications, a Page switches between different states and sub-states.

As shown here in FIG. 2H, after a Page (not shown) in Hidden sub-state 2802 receives an onShow event 2801, it enters Shown-inactive sub-state 2804. After a Page in Shown-inactive sub-state 2804 receives an onHide event 2803, it enters back to Hidden sub-state 2802. After a Page in Shown-inactive sub-state 2804 receives an onActive event 2805, it enters Shown-active sub-state 2806. After a Page in Shown-active sub-state 2806 receives an onInactive event 2807, it enters back to Shown-inactive sub-state 2804.

(2) Page Link

Page Link is an information element for transmission between Pages. Information such as, but not limited to, events, data, or the like are transmitted between Pages using Page Links. Such transmission of events and data can be implemented using a configured set of APIs (Application Programming Interfaces) according to inter-process and/or inter-thread communication protocols. Also by use of Page Links, YunOS records relationships between service components according to their communications. The URI of a target Page is configured in Page Link (e.g., stored in a configuration file), and information of events, data, and/or services can also be included in Page Link.

Pages, correlated through Page Links in a flexible manner, achieve the implementation of a variety of context-aware services.

(3) DPMS

DPMS (Dynamic Page Manager Service) as used herein refers to a system provided service component management entity. DPMS manages a Page's life cycle starting from the creation to the destruction. DPMS also manages Page's runtime scheduling, as well as inter-Page interactions via Page Links.

Figure 3:
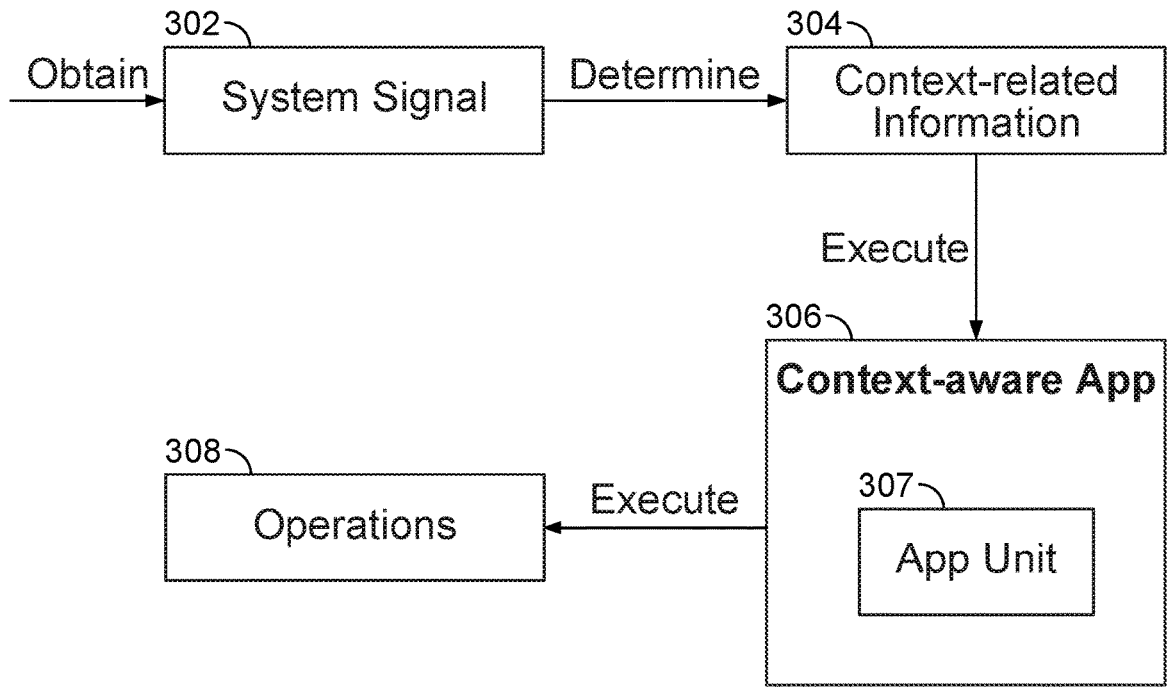
FIG. 3 is a functional block diagram of an example execution of a context-aware application, in accordance with one or more embodiments of the present disclosure.

FIG. 3 illustrates a functional block diagram of an example execution of a context-aware app, in accordance with an embodiment of the present disclosure. It should be noted that although a context-aware app is illustrated, embodiments of the present disclosure can be applied to execution of any apps in order to provide users with the corresponding context-aware services.

With the above-described service component management, a system is provided to include a service component management instance as well as N (N being an integer greater than 1) service components. Based on this system, the service component management component can be configured to receive an information entity sent by one service component directed at another service component, and to send the information entity to the second service component for processing.

With the above-described system, context-aware applications can be provided to a user according to the context.

Once Context Agents are developed, automated context-aware services based on the above-described system can be provided in accordance with embodiments of the present disclosure. In one embodiment, upon receiving a signal, Context Agent Framework detects the context-related information corresponding to the signal and determines the processing logic for that particular context-related information. As a result, Context Agent Host is tasked to execute a context-aware app to handle the determined processing logic. Such context-aware apps can include a variety of applications. For example, when a user's mobile phone detects that the temperature is above 30°, a corresponding context-aware service or app starts the air conditioner at the user's home. For another example, when a security system detects the signal that a user's home is locked and unoccupied, a corresponding context-aware app turns off certain electrical appliances such as lights at the user's home so as to conserve electricity.

In some embodiments, context-related information is used to determine the processing logic to be handled by a corresponding context-aware app, which corresponds to a service provided to in the context. In this configuration, context-related information can be used to identify the processing logic implemented by a corresponding service, including, for example but not limited to, the required system signals, the logic processing tasks, corresponding context apps, and the like.

System signals as used herein refer to data elements in the device. System signals include a device's data as well as data received by a device. For example, device data includes software data and hardware data on the device, such as device software instruction data, sensor signals, and various kinds of interface data. Data received by a device includes various command data, hardware data, and interface data received by devices. For example, when a device detects interface data indicating that earphones are connected thereto, a media player app is activated to play a song or audio files. For another example, when a device senses an external Bluetooth signal available, it connects the corresponding Bluetooth earphones or other Bluetooth device to the Bluetooth network providing the Bluetooth signals. For yet another example, when a device detects temperature data as being at a particular degree from a weather app, it turns on an air conditioning system. It should be noted that although few example types of data are illustrated, embodiments of the present disclosure can be applied to obtaining various kinds of data and determining various corresponding context-related information in order to provide users with the corresponding context-aware services.

In this example, a device is configured to receive various types of system signals by using, for example, corresponding sensors, services, or the like. Such signals can include, but are not limited to, signals of incoming phone calls, signals sensed by and transmitted from various sensors, signals of users' locations, signals generated by Internet services, and the like. After receiving one or more system signals 302, context-related information 304 is determined by use of the one or more system signals. In one embodiment, since each context handled by a context-aware app subscribes to corresponding system signals, the context-related information is used to determine the corresponding target context-aware app 306, which is executed in turn to handle the context. For example, an air conditioning context subscribes to the temperature signals, a lighting condition context subscribes to the on/off signals and to the degree of brightness of the bulbs, monitoring signals, and the like. Thus, a corresponding target context-aware app is determined based on the context-related information and consequently executed to provide services corresponding to the context. In some embodiments, a target context-aware app 306 includes at least one instance of a context-aware app unit (e.g., a Page) 307. In turn, the target context-aware app is invoked to perform operations 308 corresponding to the context-related information. For example, upon receiving respective context-related information as described-above, a control app can notify a wirelessly connected and controlled air conditioner to turn the air conditioning on to cool the temperature to 27°, and a lighting control app to turn a wirelessly connected and controlled light on or off.

Figure 4:
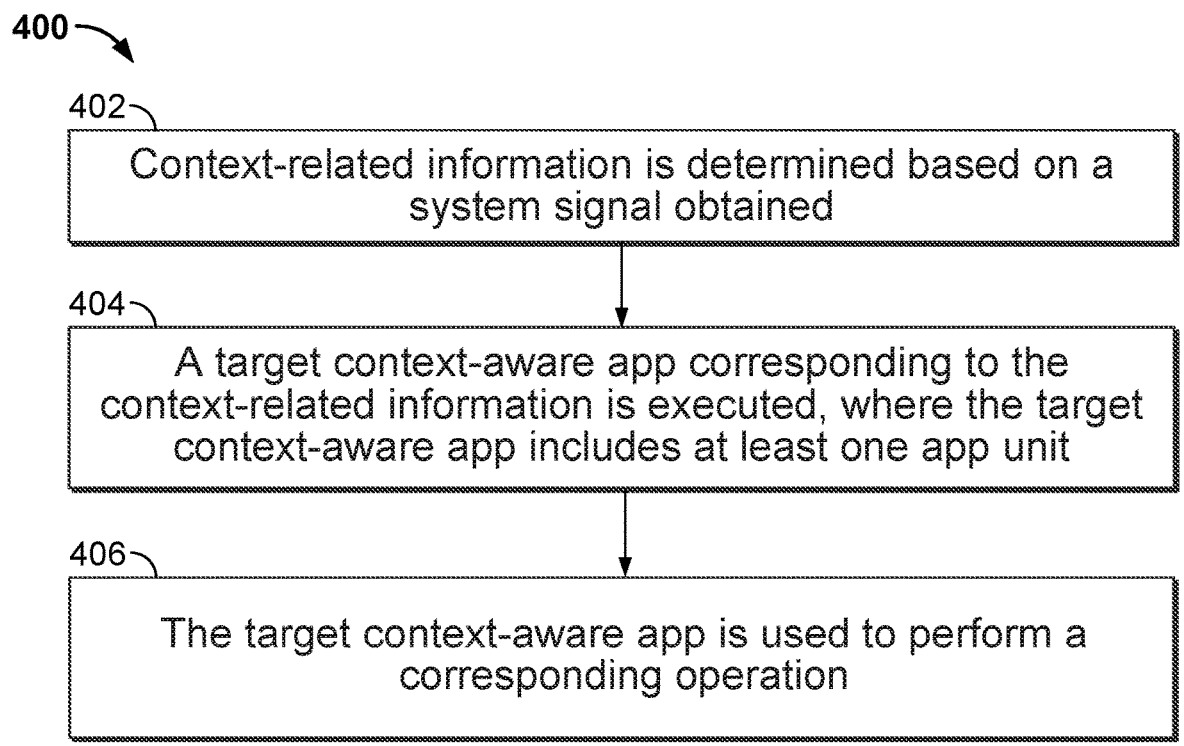
FIG. 4 is a flowchart of a process for executing an example context-aware application, in accordance with one or more embodiments of the present disclosure.

FIG. 4 illustrates a flow chart of an example process for executing a context-aware app, in accordance with an embodiment of the present disclosure. Process 400 can be implemented by, for example but not limed to, system 100 of FIG. 1. It should be noted that although a context-aware app is illustrated, embodiments of the present disclosure can be applied to execution of any apps in order to provide users with the corresponding context-aware services.

Process 400 starts at 402 where context-related information is determined based on a system signal obtained. System signals include various types of data received at the context-detecting system, as well as various types of data generated in a network such as an IoT network, and the like. For example, system signals received at a terminal device can be sensor signals associated with data received by sensors (e.g., temperature sensor, humidity sensor, motion sensor, etc.), device command signals (e.g., powering on/off signals, displaying signals, etc.), signals generated from home security systems, signals generated by lighting systems, and the like.

At 404, a target context-aware app corresponding to the context-related information is executed, the target context-aware app comprising at least one app unit. In this example, context-aware apps are pre-configured to correspond to context-related information. Each piece of context-related information can be linked to correspond to one or more system signals. As a messaging pattern, Subscription defines the data structure of messages which are published by a source and received by a subscriber. Therefore, such messages are defined to include data fields as well as data descriptions fields corresponding to the data fields. For example, a message can include a data of 30 in the data field and a description of "temperature sensor 1" in the data description field. For another example, a message can include a data of 50% in the data field and a description of "humidity sensor 1" in the data description field. Here, the above-described Subscription is used to store the relationships mapping the signals to corresponding context-related information. In other words, the context-related information is determined based on the signal by use of the subscription relationship, as a result of which the corresponding context-aware apps are determined. Each context-aware app includes at least one app unit (Page), a base component configured to sense the context and to provide services accordingly.

At 406, the target context-aware app is used to perform the operations corresponding to the context-related information.

During the execution of a system, various types of system signals received are mapped by use of the above described subscription relationships to respective context-related information. Then, a context-aware app corresponding to the context-related information is determined as the target context-aware app, which is in turn executed. The target context-aware app is used to provide context-based services according to the context-related information. For example, such target context-aware apps' operations can be configured to turn on an air conditioning system, turn off lights, play music, and the like. Therefore, the automatic context detection and automatic context-aware app execution can be applied to the IoT technology, leading to inter-communication amongst objects at an IoT network so as to achieve automatic execution of the operations responsive to a context, resulting in timely and responsive responses to a context as well as improved user experience.

In this example, a context-aware app includes one or more app units. In particular, a context app can be configured to combine one or more Pages to service a particular context. The Page corresponding to the context-related information is determined based on the context-related information, while corresponding services are provided by executing the Page using the above-described Page Link and DPMS.

According to various embodiments of the present disclosure, when applied to an IoT network, the system devices of the IoT network either control themselves or other system devices. Various system signals in the IoT network can be received and correlated to determine and thereby handle the corresponding context. Take a household network for example, system signals from a lighting system, a security system, smart household appliances (e.g., smart kitchen appliances), and the like can be distributed through a designated server of the network. When a smart phone of a user is configured to monitor the above-described household network, all the system signals of the household network are transmitted to the smart phone. The smart phone is configured to determine the context-related information corresponding to the system signals, and subsequently to distribute and process the context-related information. Embodiments of the present disclosure can be applied to the developing of various contexts based on the system signals, as well as the corresponding context-related information so as to achieve integration of the signals and services provided from various devices. By controlling the device itself or controlling other devices, a system for unified development, control, management, and maintenance is provided for automated context-aware applications.

Figure 5:
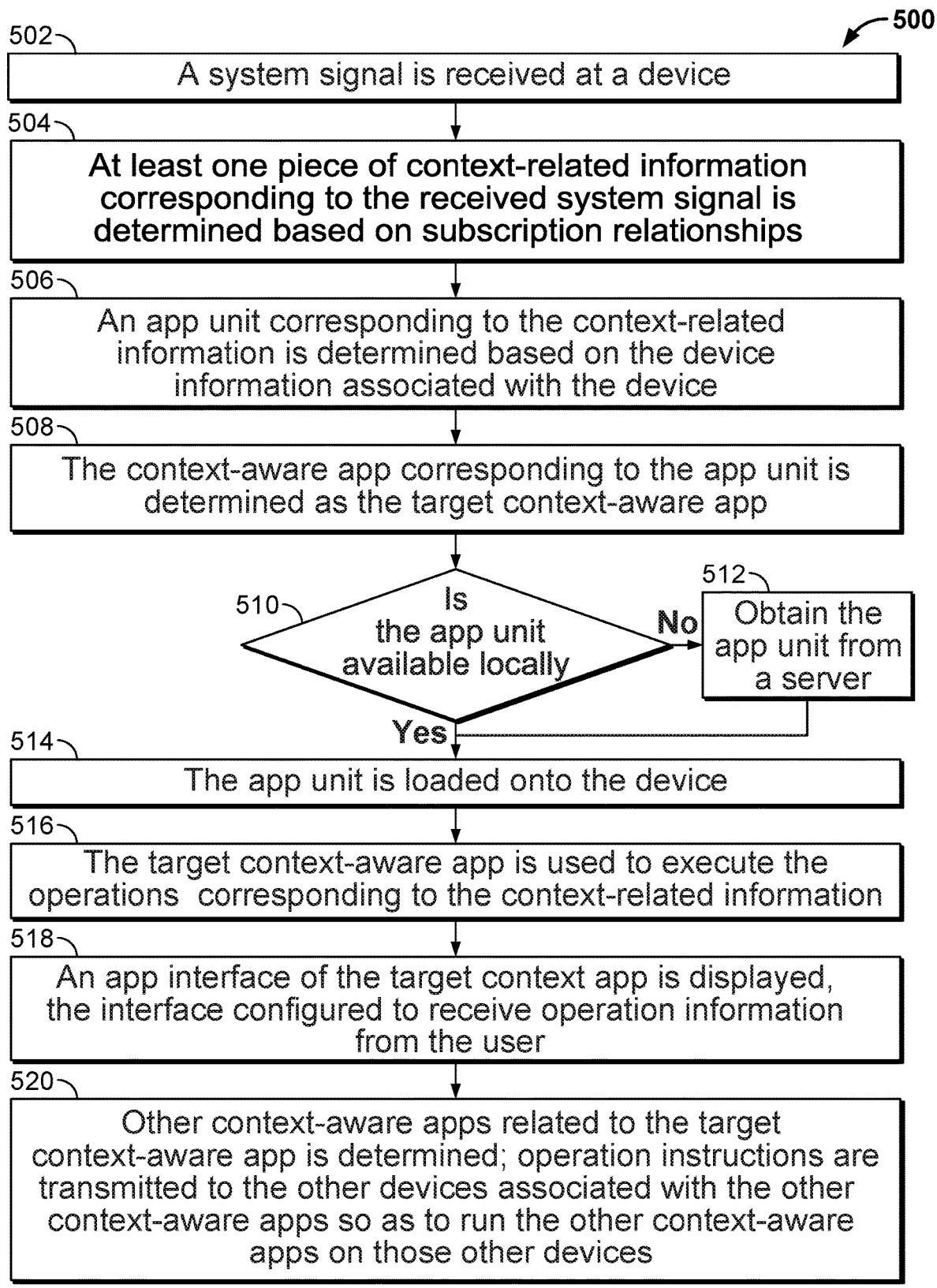
FIG. 5 is a flowchart of another example process for executing a context-aware application, in accordance with one or more embodiments of the present disclosure.

FIG. 5 illustrates a flowchart of another example process for executing a context-aware application, in accordance with an embodiment of the present disclosure. Process 500 can be implemented by, for example, system 100 of FIG. 1. It should be noted that although a context-aware app is illustrated, embodiments of the present disclosure can be applied to execution of any apps in order to provide users with the corresponding context-aware services.

Process 500 starts at 502, where a system signal is received at a device.

At 504, at least one piece of context-related information corresponding to the received system signal is determined based on subscription relationships.

System signals are pre-configured to correlate to context-related information by use of any suitable mapping logic or data structure. In this example, system signals are configured to correspond to pre-configured context-related information via the above-described subscription. In other words, system signals subscribed to by each context is stored in the form of a subscription relationship such that the context-related information corresponding to the context is determined with reference to the subscription relationship. When a device receives a system signal, the device searches through the subscription relationship to determine at least one piece of context-related information subscribing to the particular system signal. For example, receiving, from a temperature sensor or temperature app, a signal indicating a degree of the temperature, the device determines that the signal is temperature-related data based on the I/O interface information (temperature sensor interface) or the source provider information (the description of the app). The system signal is used to look up subscription relationships in order to determine the context-related information for at least one application context, which subscribes to the system signal. Again, the device can be any kind of object or device of an IoT network, such as a lighting system device or any other devices or smart devices.

In this example, each application context is configured to be able to subscribe to one or more system signals, as well as to configure context conditions for the applications. For example, a context condition can set threshold values for other system signals. Therefore, these context conditions, corresponding to their respective application contexts, may be stored in the context-related information, which is used for screening for triggering systems signals. That is, after determining one or more pieces of context-related information subscribing to a system signal, it is further determined whether other system signals subscribed to by this context-related information have been received, and whether the context conditions contained within this context-related information have been triggered.

For example, when a smart phone receives a temperature signal indicating that the temperature corresponding to the temperature signal is greater than 30°, meeting the context condition to start cooling using an air conditioning system, the smart phone turns the air conditioning system on in the cooling mode, as well as performs other corresponding operations such as holding the temperature for a period of time, etc. For another example, when a smart phone with navigation features receives a signal indicating that a vehicle has started running, the smart phone activates the on-vehicle system and starts to navigate with reference to the route previously navigated by the smart phone. For yet another example, when a smart phone receives a system signal indicating headphones have been connected thereto, the smart phone activates a media app so as to play songs, audio books, audio data, or the like.

Embodiments of the present disclosure can also be applied to integrating one or more system signals received to determine the context-related information corresponding to the one or more system signals. For example, in the case of a user's household network, after receiving a first signal indicating the temperature is above a pre-configured temperature and a second signal indicating that the television is turned on, a context is determined that the user is watching television in the living room, where the television set is located. Consequently, the air conditioning is turned on for the living room. For another example, after receiving a first system signal indicating that the kitchen oven is on and a second system signal indicating that the kitchen gas stove and range hood are operating, a context is determined that the user is cooking in the kitchen. Consequently, the smart fridge in the kitchen is operated to play music. Using the one or more system signals to determine the context information subscribing thereto, and using the determined context information to deploy a context-aware app to automatically perform the operation configured in the app to handle the context, automated context-aware services can be provided to the user.

At 506, an app unit corresponding to the context-related information is determined based on the device information associated with the device.

Device information is used to determine a target context-aware app, corresponding to the context-related information. The target context-aware app is then loaded into the system for execution. Even corresponding to the same context-related information, different context-aware apps are executed at different devices. For example, for the context information indicating the temperature being above 30° and a need for lowering the temperature, controlling the air conditioning is always the context-aware service to be activated. However, depending on which particular device is situated in the context of detected high temperature, different cooling apps are needed to control different air conditioning systems with different modes and cooling features. In particular, for a home network, it is the home air conditioning that is to be activated to lower the temperature to a target cooler temperature. For a car currently being driven by a user, it is the on-vehicle air conditioning that is to be activated to lower the temperature, perhaps to a target cooler temperature pre-configured differently than the target cooler temperature for the home network. And, for an office environment, it is the central air conditioning of the office to be adjusted to cool the temperature of the office.

At 508, the context-aware app corresponding to the app unit is determined as the target context-aware app.

After the context information has been determined, the device for detecting the context information corresponding to the system signal, and the device for performing the operations corresponding to the context-related information are determined. Given the device information, one or more app units corresponding to the device information are determined to handle the context information. Thus, given the context information, the device is configured to execute one or more Pages, and the cooperation of the execution of the one or more Pages achieves the target context-aware service. In particular, the cooperation of Pages can be implemented using Page Link to run DPMS to execute instances of Pages.

At 510, it is determined whether the app unit is available locally on the device.

Before the target context-aware app executes the operations corresponding to a Page, it is determined whether the device has a local copy of the Page. If so, process 500 proceeds to 514; otherwise, process 500 continues to 512.

At 512, the app unit is obtained from an app source such as a server.

When it is determined that the Page is not locally available, the device sends a request to an app source, e.g., a server, to obtain the Page therefrom. This page request includes a unit ID (Page ID) of the app unit, as well as other pertinent parameters. Once the server looks up the app unit using the unit ID, the server sends the app unit back to the device.

At 514, the app unit is loaded onto the device.

At 516, the target context-aware app is used to execute the operations corresponding to the context-related information.

In this example, the loading of the Page onto the device is implemented by using a protocol such as the above-described Page Link to invoke DPMS to run an instance of the Page to execute the target context-aware app corresponding to the app unit. The execution of the target context-aware app performs the operations corresponding to the context information.

At 518, an app interface of the target context app is displayed, the interface configured to receive operation information from the user.

In some embodiments, during the execution of the target context-aware app, a human-machine interface of the context-aware app, e.g., the app interface configured for the target context-aware app, is further displayed. With a user interface, the operations corresponding to the context handled by the app are communicated to the user, in addition to allowing for the users to interact with the target context-aware app.

Therefore, the display interface can be used to receive from the user operation input information corresponding to the operations carried out by the user via the app interface, and to provide feedback information or output information regarding the operation information.

For example, when the interface display shows that the air conditioning system has cooled the temperature to 27°, the user can use the interface to select, under this context, whether to turn the air conditioning off or to set a different temperature for the air conditioning system. For another example, when the security system indicates that there is nobody at home and the lights are turned off, the user can use the interface to turn on the foyer light.

At 520, other context-aware apps related to the target context-aware app are determined. Operation instructions are transmitted to other devices associated with the other context-aware app so as to run the other context-aware app on those other devices.

In some embodiments, certain contexts handled by context-aware apps require coordination amongst a multitude of devices to control the execution of operations responsive to the context. For example, when a temperature signal is received on a smart phone and a context is determined, the corresponding operations can be turning on or off an air conditioning system, closing the patio door, lowering the living room shades, etc. For another example, when a security system receives a system command, the operations can be turning on certain lights (study room light) and turning off certain lights (foyer lights) within the same lighting system. Therefore, after determining the target context-aware app, it is necessary to further determine, given the context information, other context-aware apps related to the target context-aware app, as well as other devices associated with those other context-aware apps. Operation instructions are transmitted to these other devices, and received at these other devices as system signals. The other devices use the received instructions to detect context-related information, and to invoke other context-aware apps to perform other operations corresponding to the context-related information. Again, Page Link can be used to implement the interactions between the context-aware apps, for example, to implement the invocation of another context-aware app, or to connect to other apps.

Figure 6:
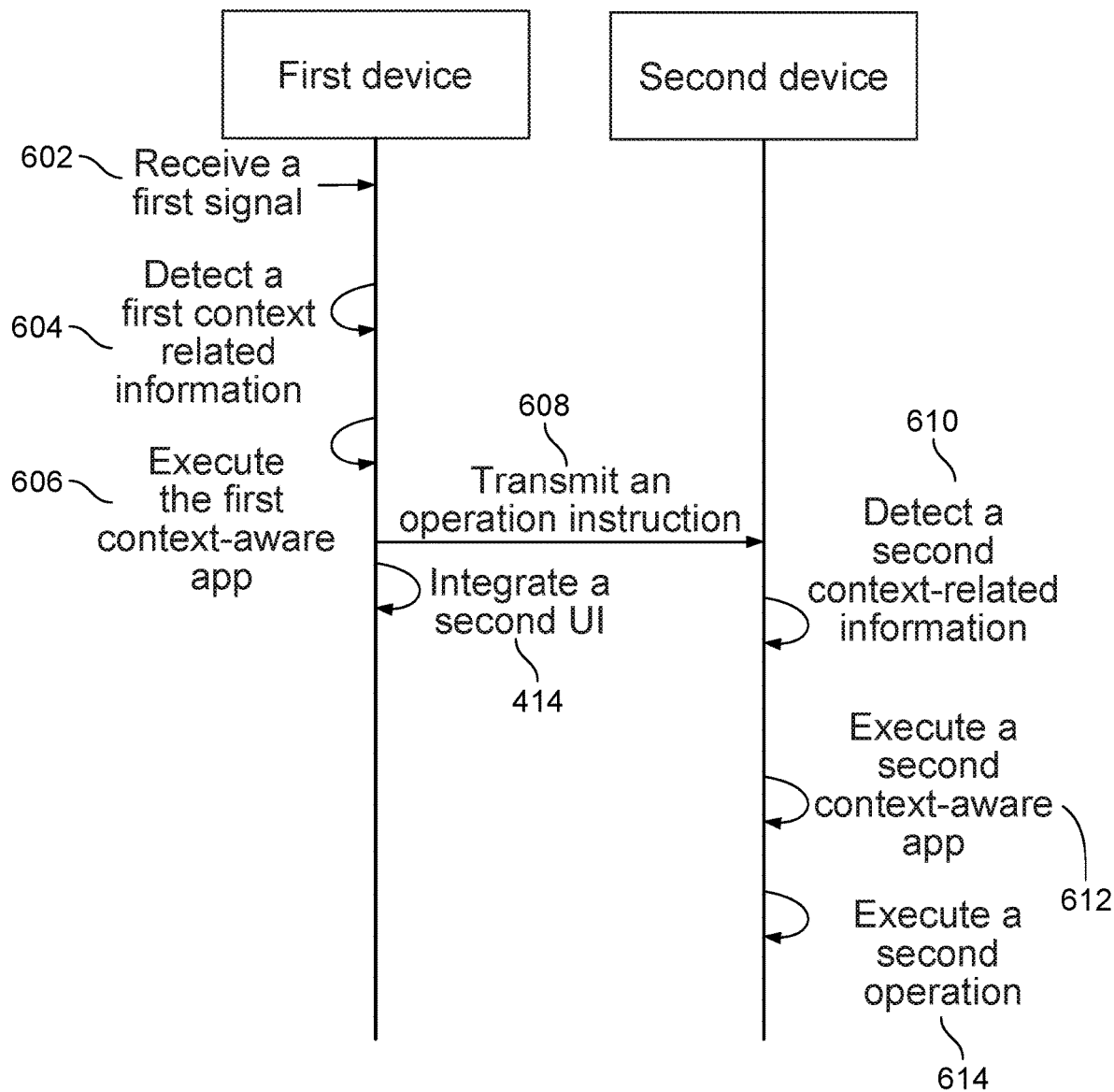
FIG. 6 is a schematic diagram illustrating an example context-aware application implemented over two devices, in accordance with one or more embodiments of the present disclosure.

FIG. 6 illustrates an example context-aware application implemented over two devices, in accordance with an embodiment of the present disclosure. It should be noted that although context-aware apps are illustrated, embodiments of the present disclosure can be applied to execution of any apps in order to provide users with the corresponding context-aware services.

At 602: a first device receives a first signal.

At 604, the first device looks up first context-related information according to a subscription relationship.

At 606, the first device runs a first context-aware app corresponding to the first context-related information.

At 608, the first context-aware app transmits an operation instruction to a second device.

At 610, the second device looks up subscription relationships based on the second signal corresponding to the operating instruction and determines the second context-related information corresponding to the second signal.

At 612, the second device runs a second context-aware app corresponding to the second context-related information.

At 614, the second context-aware app executes a second operation correspondingly.

In some embodiments, at 414, a second user interface is integrated into a display of the first device such that the user can interact with the operations by the second device.

Figure 7:
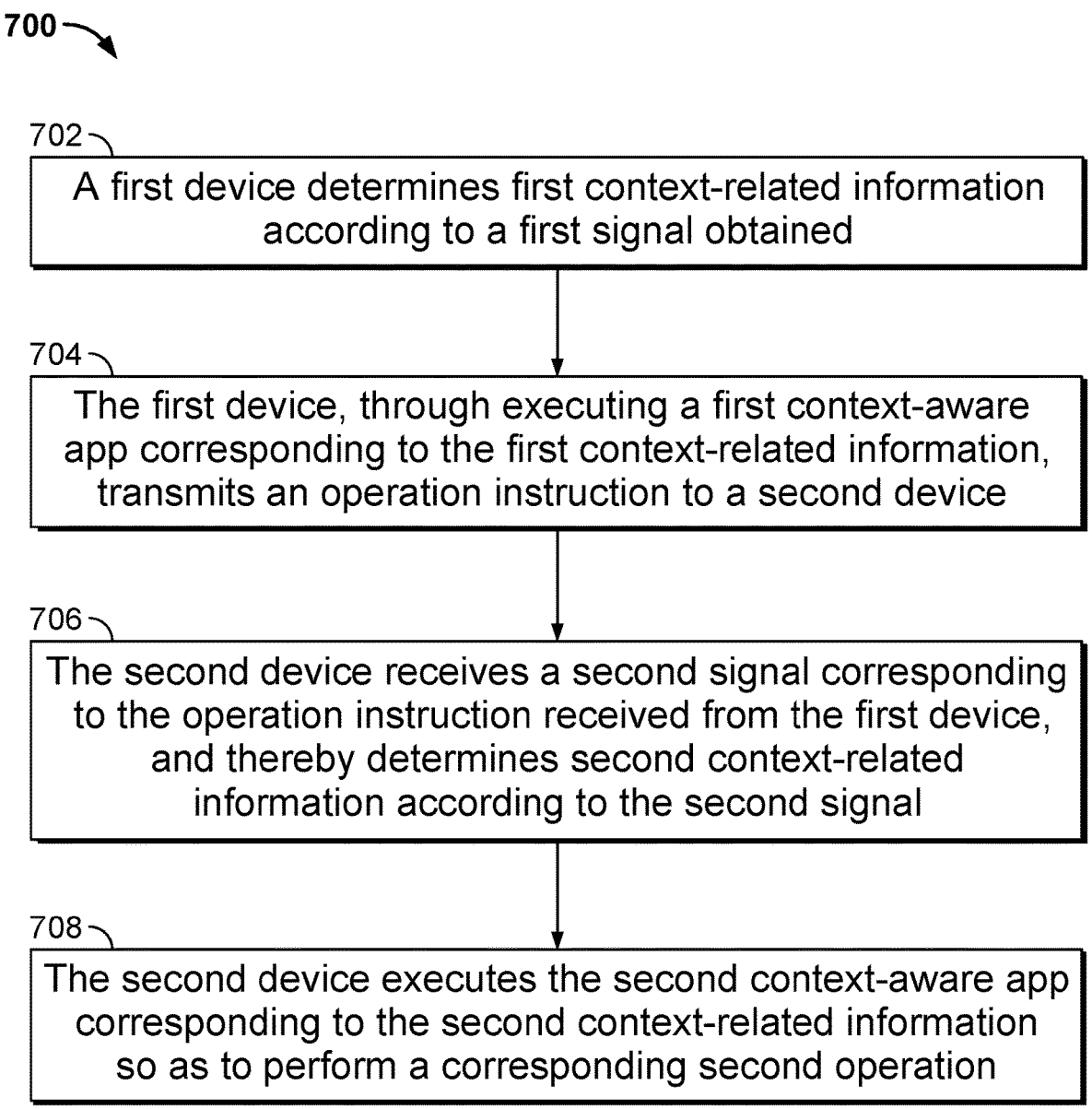
FIG. 7 is a flow chart illustrating an example process for a context-aware app executed on multiple devices, in accordance with one or more embodiments of the present disclosure.

FIG. 7 illustrates a flow chart of an example process for a context-aware app executed on multiple devices, in accordance with an embodiment of the present disclosure. It should be noted that although context-aware apps are illustrated, embodiments of the present disclosure can be applied to execution of any apps in order to provide users with the corresponding context-aware services.

Process 700 starts at 702, where a first device determines first context-related information according to a first signal obtained.

At 704, the first device, through executing a first context-aware app corresponding to the first context-related information, transmits an operation instruction to a second device.

As used herein, the system signal received by the first device is referred to as the first signal, while the system signal received by the second device is referred to as the second signal. In execution, the first device receives the first signal, which can be a request, an instruction, or some other system signal received from a server, or it could be a system signal such as data detected by a sensor of the device, or a system signal from an app running on the device, or on a device at a remote network, on other users' devices or the like. When one or more signals are received, the one or more signals are used to determine a corresponding first context-related information. In other words, the corresponding context-related information that subscribes to each of the one or more signals is looked up from subscription relationships, and determined as first context-related information. Next, a first context-aware app corresponding to the first context-related information is obtained and in turn executed to perform a corresponding first operation. When it is determined that the first context-aware app needs services provided at other context-aware apps, an inter-app or inter-service communication protocol, for example, the above-described Page Link, is used to invoke a second context-aware app on the second device and to transmit an operation instruction to the second device.

At 706, the second device receives a second signal corresponding to the operation instruction received from the first device, and thereby determines second context-related information according to the second signal.

At 708, the second device executes the second context-aware app corresponding to the second context information so as to perform a corresponding second operation.

The second device receives a second signal corresponding to the operation instruction transmitted by the first device. The second signal is used to determine the second context information. In one example, the second device uses the subscription relationship to look up the context information that subscribes to the second signal. Furthermore, the context conditions of each of the context information and other signals subscribed to are determined. When all the system signals the context information subscribes to are received, and all the pre-configured context conditions have been met, the context information is determined as the second context information. Again, a second context-aware app corresponding to the second context information is determined and in turn executed to perform the corresponding second operations.

Based on the above-described system for context-aware applications, a context-aware app is executed on multiple cooperating devices in the following example. Signal Stream of a device's Context Agent Framework collects and processes various system signals and signals from other devices. Then, with reference to Subscription, various signals are mapped to corresponding context determination and context-aware applications. Next, based on a logical unit (Agent), a determination of a context and the logical processing thereof are made. Afterwards, the service task (Actuator) is determined and executed to run an instance of Agent (Agent Instance), which corresponds to the specific device and context. With an Agent Instance, a context-aware app (Context Agent) at a higher system layer is invoked based on the inter-app interaction protocol (Page Link). Context Agent comprises an app unit (Page) configured to detect context information and to provide context-aware services. Page is executed to perform operations corresponding to the context information. When user interaction is needed, an interface is configured by use of the display module (Page Cover). Thus, Page Cover provides the human-machine interface for the context-aware app. Furthermore, Page Link can be used to communicate with other apps such as to achieve context-aware services provided by cooperation of multiple devices and multiple apps. In the process of context determination and service providing, a context engine (Context Agent Engine) is used to manage the Context Agent Host to control context apps at the higher system layer and to maintain the life cycle of the context apps. Various signal management can be used to maintain the context app's transition from one state to another state.

Two example context-aware services are illustrated below. In both examples, a context-aware app or context-aware service is developed by a developer in the form of a Cloud app, the installation package of which can be uploaded to a platform of an app center or app store (also referred to as a Page Center). In particular, a Cloud app package includes Agent code (app code) and a Manifest (list).

In the first example, a first Cloud app 1 package pertaining to signal handling from robots is uploaded to Page Center. Then, a signal corresponding to a robot is detected, and subsequently an app corresponding to robots is looked up at Page Center. Afterwards, Page Center forwards a context analysis engine to the device. The context analysis engine uses sindLink to determine DPMS/SPMS (Static Page Manager Service), which is used to look up the corresponding app. If the corresponding app is not available at the local device, a request is sent to Page Center for downloading. Otherwise, sindLink is used to invoke an app of the robot. If there is an interface configured for the app, the app interface is also displayed. During the interaction with the app interface, the required app units can be either downloaded from Page Center, or invoked from the corresponding local copy, for execution of the context-aware app.

In the second example, a second Cloud app 2 package pertaining to stock information is uploaded to Page Center, after which a signal to look up stock information is issued. Next, the app related to the stock information is identified at Page Center, which in turn forwards the app to the context analysis engine of the device. Next, the context analysis engine uses the sindLink to determine DPMS/SPMS (Static Page Manager Service), which is used to look up the corresponding context-aware app. If the context-aware app is not available at the local device, a request is sent to Page Center for downloading. Otherwise, sindLink is used to invoke the stock app. If there is an interface configured for the stock app, the app interface is displayed accordingly. During the interaction with the app interface, the required app unit can either be downloaded from Page Center, or invoked from the corresponding local copy of the app unit, for execution of the context-aware app.

After one or more Pages needed for the app context are determined, DPMS is utilized to run a Page. DPMS acquires the Page from the SPMS, which obtains the Page from a local disk when a local copy of the Page package is available, and from the Page Center if not. Where the Page is made available, DPMS runs a page execution process (Pageprocess), and displays any corresponding user interface to provide the user with service.

In an embodiment of the present disclosure, service components in the form of Pages are configured to provide users with various services. Thus, at a terminal device, a context app can be composed from the combination of multiple Pages to provide the corresponding service to the user. Transitioning from a first Page to a second Page can be performed based on a dimension of DPMS time, after which the corresponding Page is executed accordingly.

Figure 8:
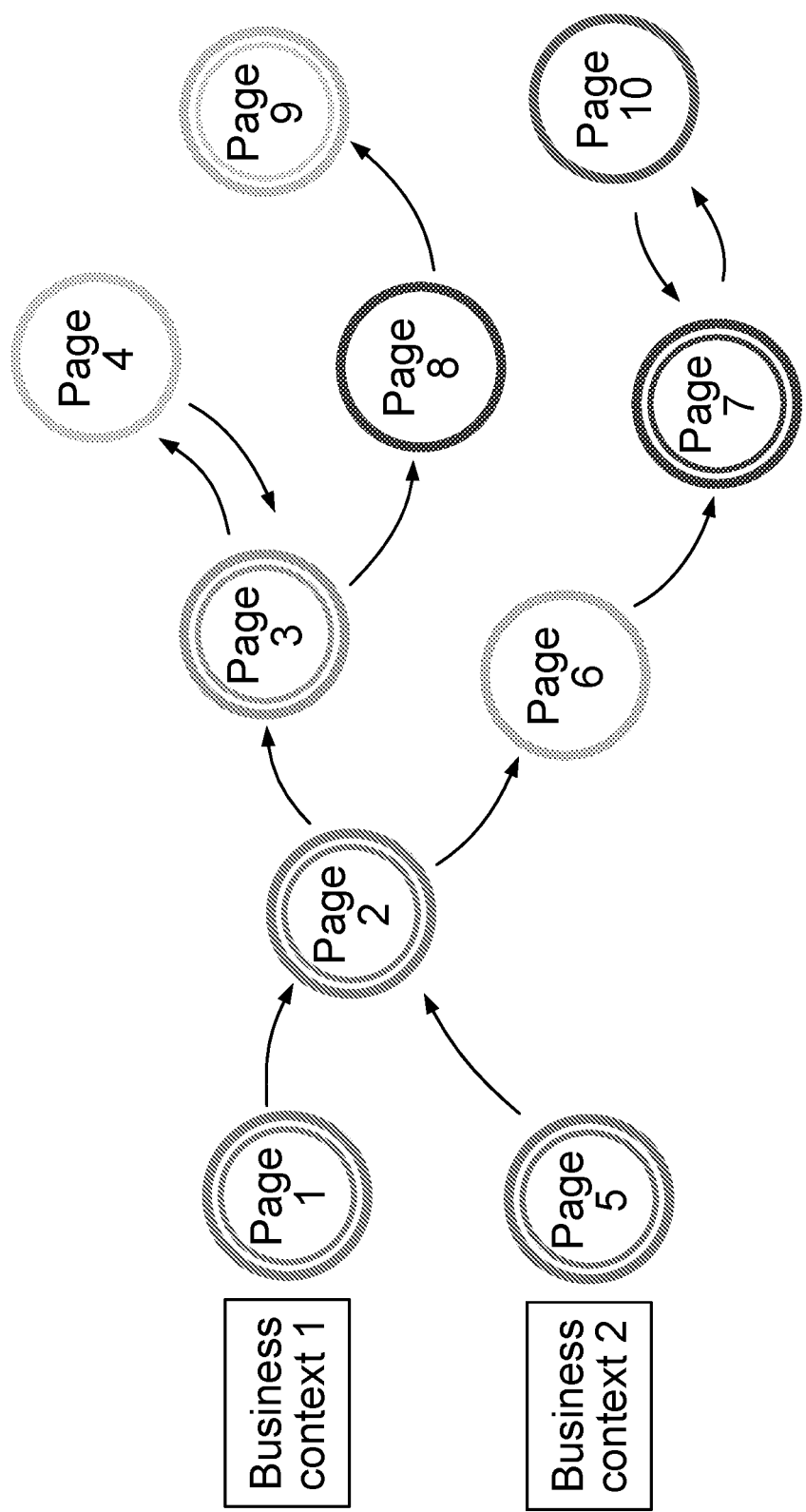
FIG. 8 is a schematic diagram illustrating an example Page transitioning of a context-aware app under two contexts, in accordance with one or more embodiments of the present disclosure.

FIG. 8 illustrates a schematic diagram of an example Page transitioning of a context-aware app under two contexts, in accordance with an embodiment of the present disclosure. It should be noted that although a context-aware app is illustrated, embodiments of the present disclosure can be applied to execution of any apps in order to provide users with the corresponding context-aware services. In a first context (app context 1), a user interacts with a user interface of a business app to trigger Page 1 to generate a Page Link directed to Page 2 to send the Page Link via DPMS to Page 2. After receiving the Page Link sent by Page 1, Page 2 processes and generates a Page Link directed to Page 3 and sends the Page Link to Page 3 via DPMS. After receiving and processing of this Page Link, Page 3 not only generates a Page Link directed to Page 4 and sends the Page Link to Page 4 via DPMS, but also generates a Page Link directed to Page 8 to be sent via DPMS to Page 8. After receiving the Page Link, Page 4 processes it and sends the processing result back to Page 3.

In a different context (app context 2), the user interacts with the UI configured for the business app to trigger Page 5 to generate a Page Link directed to Page 2 and sends the Page Link via DPMS to Page 2. After receiving the Page Link sent by Page 5, Page 2 processes and generates a Page Link directed to Page 6 and sends it to Page 6 via DPMS. After receiving the Page Link, Page 6 processes it to generate a Page Link directed to Page 7, and sends it to Page 7 via DPMS. After Page 7 receives the Page Link, it processes it and generates a Page Link directed to Page 10, and sends it via DPMS to Page 10. After Page 10 receives the Page Link, it processes it and sends the processing result back to Page 7.

For example, based on the system signals generated from a user travel guide Page, it is determined that the context is that the user is planning on a trip. At this point, this context is used to furnish other types of Pages related to providing services such as an air ticket app, a hotel app, a payment app, a weather app, and so on. By transitioning from the travel guide Page to the weather Page back to the travel guide Page, to the air ticket Page, to the hotel Page, and to the Payment Page, the user no longer needs to manually switch to these relevant other apps from the travel guide app. With the ability to transition from Page to Page, and the linkage relationships between Pages correspond to a context, various kinds of services are provided to the user under the particular context. With embodiments of the present disclosure, the above-described app development system model allows for a developer to develop context-aware services or apps, and to correlate various devices and services towards providing users with a wide variety of services as well as convenient operation thereof.

Figure 9:
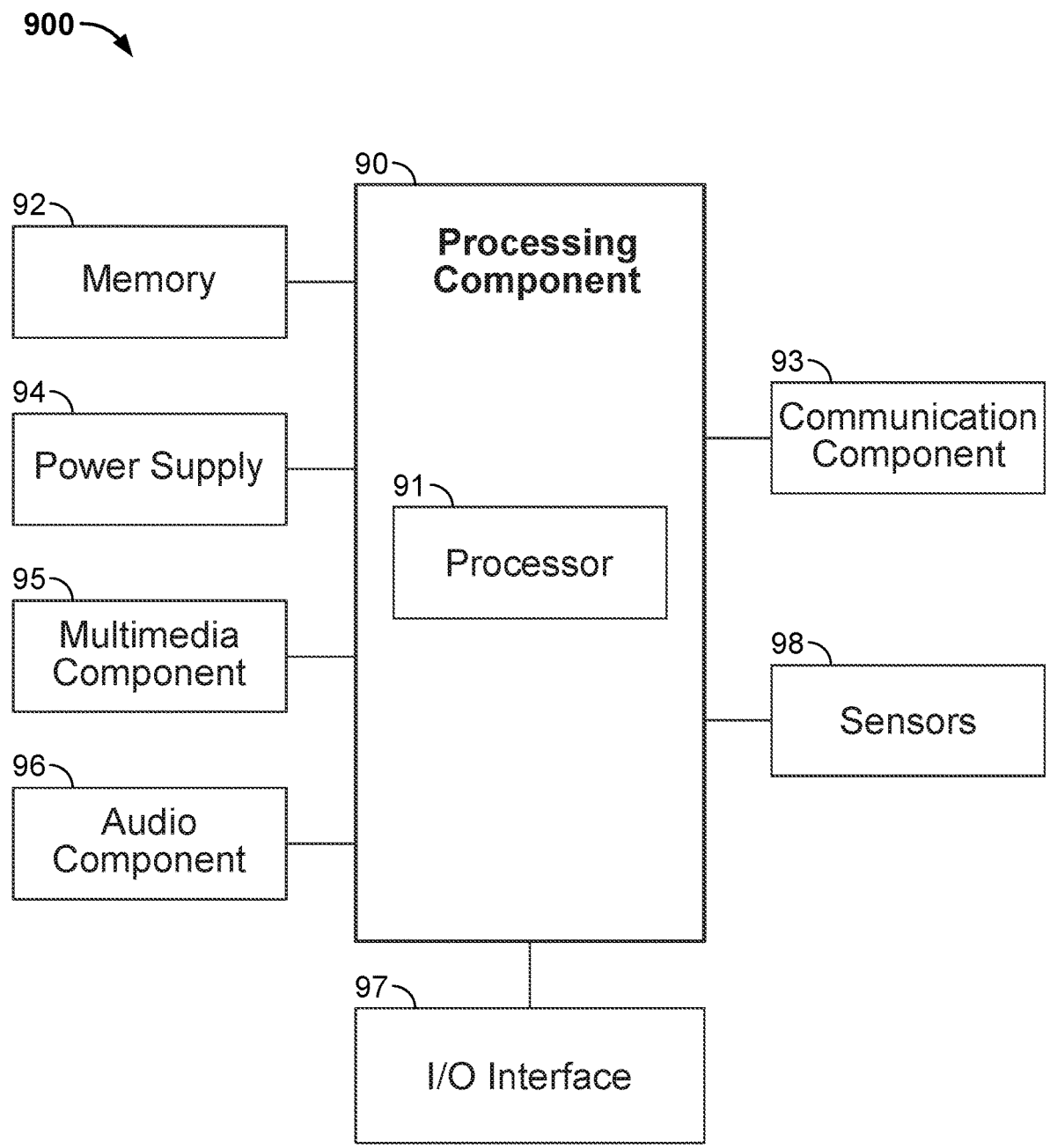
FIG. 9 is a functional diagram illustrating an embodiment of a programmed computer system for context-aware applications, in accordance with one or more embodiments of the present disclosure.

FIG. 9 is a functional diagram illustrating an embodiment of a programmed computer system for context-aware applications, in accordance with an embodiment of the present disclosure. Computing system 900 can be used to implement system 100 of FIG. 1 and processes of FIGS. 4-7, as appropriate. As will be apparent, other computer system architectures and configurations can be used to implement the systems and methods for context-aware applications. Computing system 900 includes a processor 91 and a memory 92. Processor 91 executes the computer code stored in memory 92 to implement the above-described processes.

Memory 92 is configured to store data in support of terminal device operations. Example data includes any app or method instructions, such as messages, pictures, and video, used for operations on the terminal device. Memory 92 may be random access memory (RAM) or non-volatile memory such as a magnetic disk storage device.

Optionally, Processor 91 is configured in a processing component 90. Computing system 900 may further comprise a communication component 93, a power supply component 94, a multimedia component 95, an audio component 96, an input/output interface 97, and/or a sensor component 98.

Processing component 90 controls the overall operations of computing system 900. Processing component 90 can comprise one or more processors 91 for executing instructions. In addition, processing component 90 may comprise one or more modules to facilitate interaction between processing component 90 and other components. For example, processing component 90 may comprise a multimedia module to facilitate interaction between multimedia component 95 and processing component 90.

Power supply component 94 provides electric power to the various components of computing system 900. Power supply 94 can include a power supply management system, one or more power supplies, and other components related to generating, managing, and allocating power to computing system 900.

Multimedia component 95 comprises an output interface display screen provided between computing system 900 and a user. In some embodiments, the display screen may comprise a liquid crystal display (LCD) or a touch panel (TP). If the display screen comprises a touch panel, the display screen may be implemented as a touchscreen to receive input signals from the user. The touch panel comprises one or more touch sensors to detect touches, sliding actions, and gestures on the touch panel. Said touch sensor can not only detect the boundaries of touch or slide actions, but also can measure duration and pressure related to said touch or slide operations.

Audio component 96 is configured to output and/or input audio signals. For example, audio component 96 includes a microphone (MIC). When computing system 900 is in an operating mode, e.g., speech recognition mode, the microphone is configured to receive external audio signals. The received audio signals can be further stored in storage device 92 or sent by communication component 93. In some embodiments, audio component 96 further comprises a speaker for output of audio signals.

Input/output interface 97 provides an interface between processing component 90 and peripheral interface modules. The peripheral interface modules may be keyboards, click wheels, buttons, etc. These buttons may include but are not limited to: volume button, start button, and lock button.

Sensor component 98 comprises one or more sensors and is used to provide status evaluations of various aspects of computing system 900. For example, sensor component 98 may detect the on/off status of the terminal device, the relative position of the component, and the presence or absence of contact between the user and computing system 900. Sensor component 98 may comprise a near sensor, which is configured to detect the presence of a nearby object when there is no physical contact, including measurement of distance between the user and the terminal device. In some embodiments, sensor component 98 may further comprise a camera.

Communication component 93 is configured to facilitate wired or wireless communication between computing system 900 and other devices. Computing system 900 may access wireless networks based on a communications standard such as Wi-Fi, 2G, 3G, or combinations thereof. Computing system 900 may comprise a SIM card slot for inserting a SIM card, which enables the terminal device to register with a GPRS network and establish communication between the Internet and servers.

Upon considering the invention disclosed here in the description and in practice, persons skilled in the art shall easily think of other schemes for implementing the present application. The present application intends to cover any variation, use, or adaptation of the present application where the variation, use, or adaptation complies with the general principles of the present application and includes public knowledge or customary technical means in the art not disclosed by the present application. The description and embodiments are regarded merely as illustrative. The true scope and spirit of the present application are indicated by the claims below.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or devices that comprise said elements.

The above-described are merely preferred embodiments of the present application and do not serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining context-related information based on a system signal obtained, comprising:
        receiving the system signal from an interface of a device; and
        determining, based at least in part on subscription information that maps the system signal to the context-related information, at least one piece of context-related information corresponding to the system signal, comprising:
            searching in the subscription information by using the system signal to determine the at least one piece of context-related information, the context-related information subscribing to the system signal;
    selecting, among a plurality of applications, a target application corresponding to the context-related information, comprising:
        selecting the target application based on a first context-related information or a second context-related information, wherein the first context-related information is different from the second context-related information;
    determining whether the selected target application is available locally;
    in response to a determination that the selected target application is not available locally:
        obtaining the selected target application from a server; and
        loading the selected target application for execution;
    executing the target application corresponding to the context-related information; wherein:
    the target application comprises at least one application unit; and
    the execution of the target application corresponding to the context-related information includes using the target application to perform a corresponding operation.

2. The method of claim 1, further comprising:
    selecting, according to a context condition of the context-related information, one or more triggered pieces of context-related information from the context-related information, wherein the one or more triggered pieces of context-related information meet the context condition.

3. The method of claim 1, wherein the executing of the target application comprises:
    determining, by use of a device, the target application corresponding to the context-related information; and
    loading the target application for execution.

4. The method of claim 3, wherein the determining the target application by use of the device comprises:
    determining, by use of device information of the device, the at least one application unit corresponding to the context-related information; and determining an application corresponding to the at least one application unit as the target application.

5. The method of claim 1, further comprising:
obtaining the at least one application unit from a server when the at least one application unit is not locally available.

6. The method of claim 1, wherein states of the target application comprises a created state, a running state, a frozen state, and a stopped state.

7. The method of claim 1, wherein the executing of the target application corresponding to the context-related information comprises:
executing the target application corresponding to the context-related information; and
controlling states of the target application.

8. The method of claim 1, further comprising:
displaying an application interface for the target application, wherein user command information is received via the application interface.

9. The method of claim 1, further comprising:
determining at least one other application correlating to the target application; and
sending instructions to a device associated with the at least one other application so that the at least one other application is executed on the device.

10. A device for context-based applications, comprising:
one or more processors configured to:
determine context-related information based on a system signal obtained, comprising to:
receive the system signal from an interface of a device; and
determine, based at least in part on subscription information that maps the system signal to the context-related information, at least one piece of context-related information corresponding to the system signal, comprising to:
search in the subscription information by using the system signal to determine the at least one piece of context-related information, the context-related information subscribing to the system signal;
select, among a plurality of applications, a target application corresponding to the context-related information, comprising to:
select the target application based on a first context-related information or a second context-related information, wherein the first context-related information is different from the second context-related information;
determine whether the target application corresponding to the context-related information is available locally;
in response to a determination that the target application is not available locally:
obtain the target application from a server; and
load the target application for execution;
execute the target application corresponding to the context-related information, wherein the target application comprises at least one application unit; and
use the target application to perform a corresponding operation; and
one or more memories coupled to the one or more processors and configured to provide the one or more processors with instructions.

11. An application system comprising a first device and a second device, wherein:
the first device, comprising:
a processor; and
a memory coupled with the processor, wherein the memory is configured to provide the processor with instructions which when executed cause the processor to:
determine a first piece of context-related information according to a first signal obtained, comprising to:
receive the first signal from an interface of a device; and
determine, based at least in part on subscription information that maps the first signal to the context-related information, at least one piece of context-related information corresponding to the first signal, comprising to:
search in the subscription information by using the first signal to determine the at least one piece of context-related information, the context-related information subscribing to the first signal;
select, among a plurality of applications, a first application corresponding to the context-related information, comprising to:
select the first application based on a first context-related information or a second context-related information, wherein the first context-related information is different from the second context-related information; and
execute the first application corresponding to the first piece of context-related information; and
send an instruction to a second device;
the second device, comprising:
a processor; and
a memory coupled with the processor, wherein the memory is configured to provide the processor with instructions which when executed cause the processor to:
receive a second signal corresponding to the instruction, wherein a second piece of context-related information is obtained according to the second signal;
determine whether a second application corresponding to the second piece of context-related information is available locally;
in response to a determination that the second application is not available locally:
obtain the second application from a server; and
load the second application for execution; and
execute the second application corresponding to the second piece of context-related information to perform a corresponding second operation.

12. A computer program product for applications, the computer program product being embodied in a tangible non-transitory computer readable storage medium and comprising computer instructions for:
determining context-related information based on a system signal obtained, comprising:
receiving the system signal from an interface of a device; and
determining, based at least in part on subscription information that maps the system signal to the context-related information, at least one piece of context-related information corresponding to the system signal, comprising:
searching in the subscription information by using the system signal to determine the at least one piece of context-related information, the context-related information subscribing to the system signal;

selecting, among a plurality of applications, a target application corresponding to the context-related information, comprising:
  selecting the target application based on a first context-related information or a second context-related information, wherein the first context-related information is different from the second context-related information;
determining whether the target application corresponding to the context-related information is available locally;
in response to a determination that the target application is not available locally:
  obtaining the target application from a server; and
  loading the target application for execution;
executing the target application corresponding to the context-related information, wherein the target application comprises at least one application unit; and
using the target application to perform a corresponding operation.

* * * * *